(12) United States Patent  (10) Patent No.: US 6,281,476 B1
Voizey  (45) Date of Patent: Aug. 28, 2001

(54) DEVICE FOR APPLYING HEAT TO AN ADHESIVE

(75) Inventor: Andrew Robert Voizey, Yeovil (GB)

(73) Assignee: GKN Westland Helicopters Limited, Yeovil (GB)

( * ) Notice: Subject to any disclaimer, the term of this patent is extended or adjusted under 35 U.S.C. 154(b) by 0 days.

(21) Appl. No.: 09/500,787

(22) Filed: Feb. 9, 2000

(30) Foreign Application Priority Data

Feb. 9, 1999 (GB) .................................................. 9902730

(51) Int. Cl.[7] ....................................................... F24C 7/10
(52) U.S. Cl. ........................... 219/386; 219/225; 219/227; 219/521; 392/385
(58) Field of Search ........................ 219/386, 520, 219/521, 527, 533, 535, 209, 210, 221, 227, 225, 121.66, 121.85, 391; 392/384, 385, 409; 385/59

(56) References Cited

U.S. PATENT DOCUMENTS

| | | |
|---|---|---|
| 4,510,005 * | 4/1985 | Nijman ............................ 219/121.85 |
| 4,628,989 * | 12/1986 | Parker et al. ........................ 219/535 |
| 4,713,523 | 12/1987 | MacDonald . |
| 4,924,602 * | 5/1990 | Ohlsen ................................ 392/385 |
| 5,060,289 * | 10/1991 | Abramson ............................ 392/409 |
| 5,168,145 | 12/1992 | Tackett et al. . |
| 5,274,215 * | 12/1993 | Jackson ................................ 219/521 |
| 5,434,387 * | 7/1995 | Haley ................................... 219/535 |
| 5,446,819 | 8/1995 | Foster et al. . |
| 5,700,987 * | 12/1997 | Basavanhally ...................... 219/209 |
| 5,757,996 * | 5/1998 | Vine ...................................... 385/59 |
| 5,919,383 * | 7/1999 | Beguin et al. ....................... 219/209 |
| 5,954,978 * | 9/1999 | Seelert et al. ....................... 219/209 |
| 5,994,679 * | 11/1999 | DeVeau et al. ..................... 219/209 |
| 6,114,673 * | 9/2000 | Brewer et al. ...................... 219/209 |

FOREIGN PATENT DOCUMENTS 1 567 636  5/1980  (GB) .
WO 96/05528  2/1996  (WO) .

\* cited by examiner

*Primary Examiner*—Teresa Walberg
*Assistant Examiner*—Fadi H. Dahbour
(74) *Attorney, Agent, or Firm*—Larson & Taylor, PLC

(57) ABSTRACT

A device for applying heat to an adhesive of the type used to set an optical fibre in a termination therefor, the device including a portable housing, a heater disposed within the housing and a holder for holding the termination in operative relationship with the heater to promote curing of the adhesive.

24 Claims, 2 Drawing Sheets

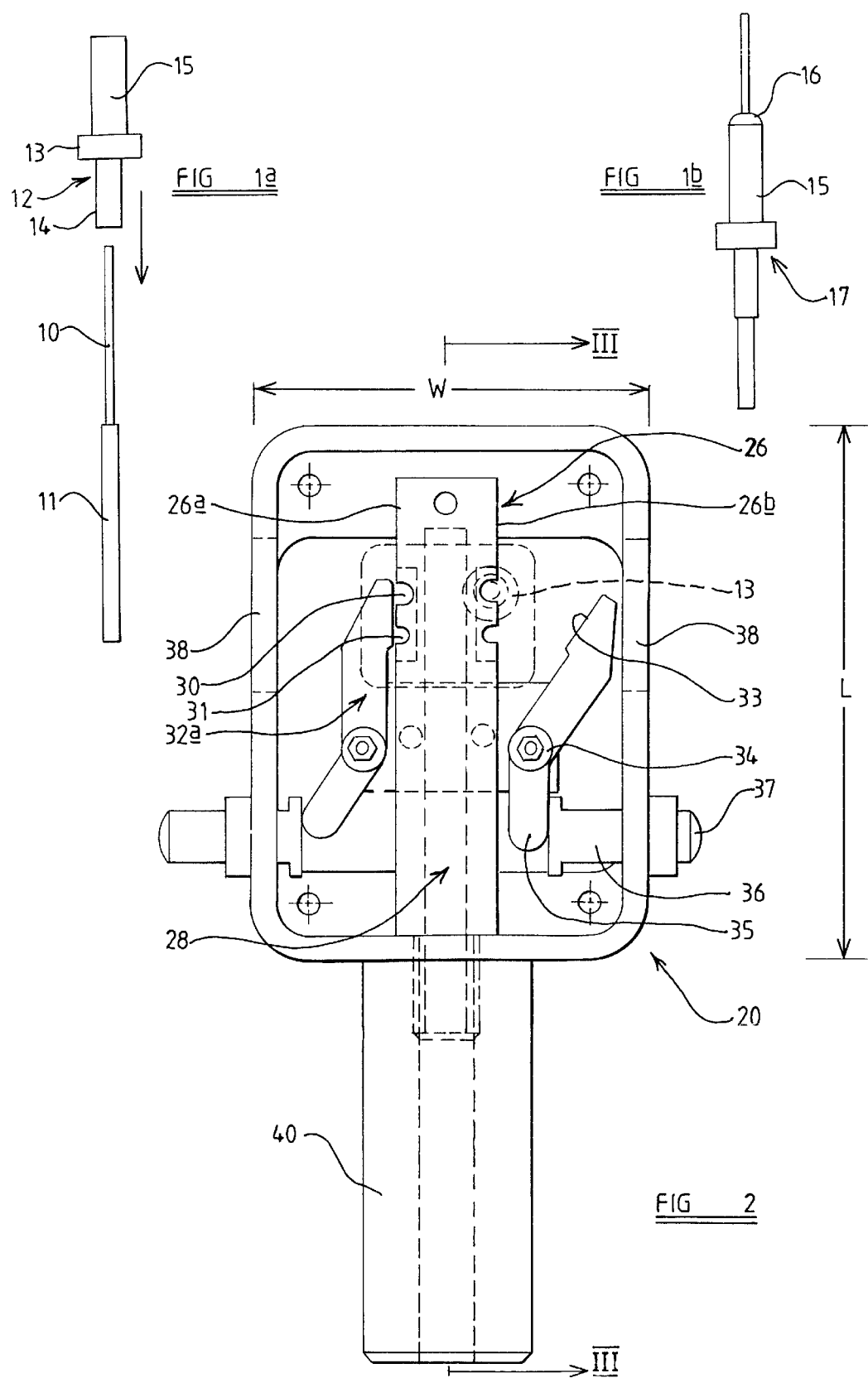

DEVICE FOR APPLYING HEAT TO AN ADHESIVE

BACKGROUND TO THE INVENTION

This invention relates to a device for applying heat to an adhesive of the type used to set a fibre optic cable in a termination therefor.

DESCRIPTION OF THE PRIOR ART

Fibre optic cables are used for the transmission of data, with data transfer being accomplished by the transmission of pulses of light through a fibre comprising a core contained in a cladding having a different refractive index. The fibre typically having a diameter of about 50–300 microns.

Whilst the fibre may be protected by one or more outer layers, including, for example, a wear resistant sheath, it is necessary to attach the cable to a termination when it is required operatively to connect the fibre with data handling apparatus, or when it is desired to allow light to pass from the fibre into another fibre, at a connector interface.

Typically, such terminations include a metallic ferrule and a guide, the guide typically being formed from a ceramic material, through which the fibre extends to an optical end surface thereof, with the fibre being set in the guide by adhesive.

Setting of the fibre in the guide may be accomplished by introducing adhesive into the termination, prior to insertion of the fibre so that when the fibre is introduced, the adhesive is moved along the guide, and usually some of the adhesive is urged from the interior of the guide onto the external end surface. The fibre (and adhesive on the end surface) may then be subjected to a finishing operation such as polishing to ensure that an optically flat surface is obtained.

Alternatively or in addition, adhesive may be added to the core/guide interface subsequent to the introduction of the fibre, at the end surface.

In each case, curing of the adhesive needs to occur before any polishing operation can be carried out.

In view of the strength characteristics which are required of such adhesives, it has become usual in the fibre optics field to employ adhesives of the kind requiring an input of heat for satisfactory curing to be obtained in an acceptable time frame, with the industry standard currently being an adhesive available under the Trade Mark Epo-Tek 353ND.

Two-part epoxy adhesives such as this require heat to be applied in accordance with a particular temperature/time profile to promote curing, and it has hitherto been necessary to do this by placing the fibre and termination in a temperature controlled oven.

The use of such ovens presents few problems under laboratory conditions, where skilled operators are available. However, where space is limited, or where skilled operators are not available, the application of heat to promote curing may be problematic.

Such conditions are often present oil aircraft, where in situ repairs may be desirable.

SUMMARY OF THE INVENTION

According to one aspect of the present invention, we provide a device for applying heat to an adhesive of the type used to set an optical fibre in a termination therefor, the device compromising a portable housing, heating means disposed within the housing and holding means for holding the termination in operative relationship with the heating means to promote curing of the adhesive.

Thus the heating means may be used in situ to apply heat to an adhesive during a fibre optic termination method.

The heating means may comprise a heating member having at least one recess or apeiture therein, into or through which a generally rigid guide of the termination may extend, in use.

The recess or apeiture is preferably dimensioned and/or configured so as to receive the guide of the termination in a close fitting manner, such that heat from the heating means may be transferred to the guide quickly and efficiently.

Preferably, the recess or aperture is provided along an edge portion of the heating member. The recess or apeiture may be generally concave.

Preferably, the heating member comprises a plurality of differently sized or configured recesses or apertures, such that a variety of sizes and types of fibre optic cable terminations may be received therein.

To provide further versatility, the heating member may be removable from the housing, such that an alternative heating member having recesses or apertures suitable for other shapes/sizes of fibre optic cable terminations, may be inserted.

The heating member is preferably generally elongate, and the recesses/apertures may be provided along two opposite sides thereof.

In this way, two or more terminations may be inserted simultaneously to promote curing. It will be appreciated that to accomplish this, two (or more) holding means may be provided.

The heating member may itself be heated by a heating element which may be electrically powered, and may be located, in use, generally within the heating member.

The heating element may be releasably attachable to the heating member, conveniently by screw-threaded means. In this way, the heating element may be replaced should it fail or become damaged.

The holding means may comprise a bearing surface, which, with the holding means in an operative position, bears upon the guide of the termination, urging it into operative relationship with the heating block.

Preferably, the holding means comprises a clamping member, which may be mounted about a pivot within the housing.

The clamping member is preferably urged towards its operative position by the action of a spring or other resilient member.

Conveniently, the bearing surface of the holding means is adapted to hold in operative relationship a termination disposed within any of a plurality of recesses/apertures.

Preferably, the holding means is moved from its operative position to an inoperative position by the action of an operating member, such as a lever or button, which in use protrudes from the housing, which operating member may be mounted for reciprocating movement relative to the housing.

Linkage means may be provided to convert reciprocating movement of the operating member to pivotal movement of the holding means.

The housing may comprise at least one viewing aperture therein, to provide a line of sight to an operator of the device, so that the operator may ensure that correct insertion of the termination has occurred.

The line of sight may be generally perpendicular to the extent of the fibre optic cable or cables.

The device is preferably provided with a handle portion, so that movement and positioning of the device may be facilitated.

This may be particularly advantageous when it is desired to effect a repair to a fibre optic cable in situations where space is limited, such as on board an aircraft. In such circumstances, there is often little or no spare cable available, and it is therefore necessary to effect the repair in situ.

The housing may also be provided with attachment means to enable it to be secured in position during a curing operation. Again, this may be especially advantageous on board an aircraft, where in situ repairs to hanging and/or relatively inaccessible fibre optic cables may be required.

Moreover, the attachment means enable the device, once a termination has been inserted, to be left in position whilst curing of the adhesive is promoted.

Thus, there may be provided a hook and loop fastener arrangement, part of which is attached to the housing, Alternatively, other attachment means such as a hook or a clamp could be utilised.

Preferably, the device is powered by a relatively low voltage source, such as a 28 (twenty-eight) volt DC power source, commonly found in aircraft electrical systems.

Thus, power for the device may be obtained directly from such an electrical system, although it will be appreciated that batteries or other charge storage devices could be used to improve the portability of the device, if required.

So that appropriate curing programmes (i.e. temperature/time profiles) may be employed, the heat applying device, in use, may be operatively connected to a suitable control means.

The temperature/time profile required will vary in accordance with the particular adhesive used, although in the case of the industry standard, Epo-Tek 353ND, heating the adhesive to a temperature of approximately 100° C. for thirty minutes to one hour, has been found to be satisfactory.

According to a second aspect of the present invention, there is provided a method of setting a fibre of a fibre optic cable in a termination therefor, comprising:

(a) engaging the fibre with the termination;
(b) applying adhesive or causing adhesive to be applied to the fibre and/or termination;
(c) introducing the engaged fibre and termination into a housing containing heating means; and
(d) holding the assembly in operative relationship with the heating means, until curing of the adhesive, promoted by the heating means, has been effected.

The method described above may involve the use of a device in accordance with one or more of the preceding paragraphs.

BRIEF DESCRIPTION OF THE DRAWINGS

The invention will now be described by way of example only, by reference to the accompanying drawings, wherein:

FIGS. 1a and 1b illustrate the initial stages in the production of a fibre optic cable/termination;

FIG. 2 is a plan view of a device in accordance with the present invention, shown with a cover portion removed.

DESCRIPTION OF THE PREFERRED EMBODIMENT

Figure 3:
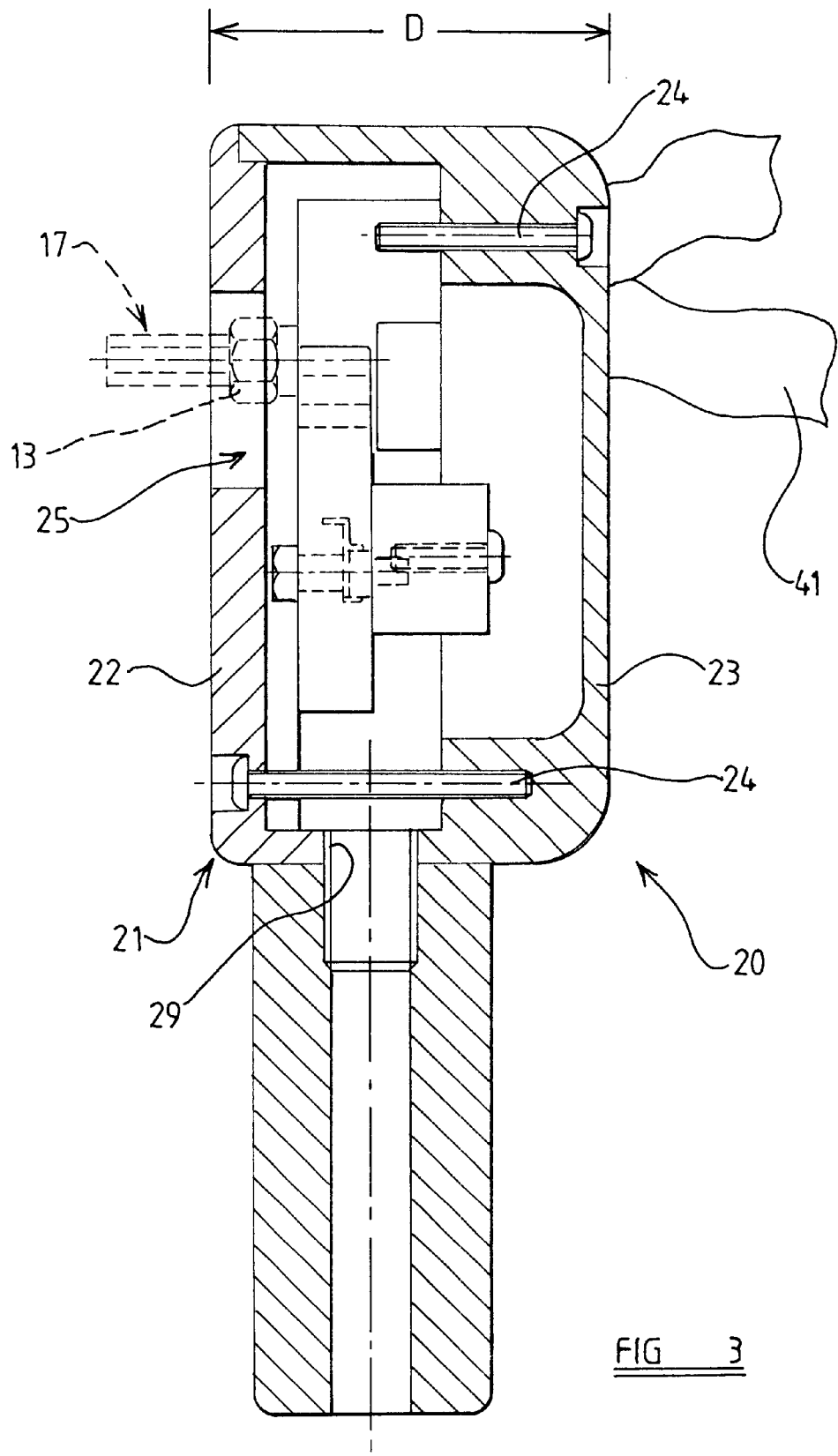
FIG. 3 is a cut-away side view of the device of FIG. 2, taken generally along the line III—III thereof.

Referring first to FIG. 1A, there is shown a fibre optic core 10 located within a protective outer sheath 11, and a termination therefor, generally indicated at 12, comprising a metallic ferrule 13 disposed between concentric rigid guides 14 and 15, with the guide 15 being formed of an electrically non-conducting ceramic material.

It will be appreciated that the fibre 10 may be surrounded by a plurality of protective layers within the sheath 11, and the fibre 10 is shown with all such layers having been stripped back.

To bring the termination 12 and fibre 10 into engagement, a projecting part of the fibre 10 is inserted through the guides 14 and 15, and an appropriate quantity of a specified adhesive is used to effect a bond between the fibre 10 and the guide 15.

This may be effected by applying the adhesive subsequent to the engagement of the fibre 10 and termination 12, resulting in a dome 16 of adhesive being produced at a distal optical end surface of the guide 15, as shown in FIG. 1b.

Suitable adhesives used for such purposes generally comprise two-part epoxy adhesives, such as the type requiring heating to promote post-mix curing.

In order thus to promote curing in circumstances where it is not possible or practical to provide an oven of the type which is conventionally used in a laboratory, the fibre/termination generally indicated at 17 in FIG. 1b is introduced into a device for applying heat to an adhesive such as that which is illustrated by reference numeral 20 in FIGS. 2 and 3.

The device 20 comprises a housing 21 having a base 22 and a removable cover 23, attachable to the base by (for example) threaded fasteners 24.

The housing 21, which conveniently has a length L of about 80 millimetres, a width W of about 60 millimetres, and a depth D of about 40 millimetres, comprises an aperture 25 in the base 22, through which the fibre/termination 17 may be introduced.

Disposed within the housing 21 is a heater block 26, formed of a heat conducting (e.g. metallic) material, which in use abuts an inner surface of the housing 21. Heat is supplied to the heater block 26 by an electrically operated heating element 28 which is received within the heater block 26 in a screw-threaded manner.

As will be seen from the drawings, the heating element 28 is also received in a screw-threaded manner in an aperture 29 extending through a lower part of the housing 21.

In this way, the heating element may be replaced should it fail or become damaged.

The heating block 26 is provided along its longer sides 26a and 26b with a plurality of (in this example two) concave receiving formations 30 and 31, configured and/or dimensioned so as to receive closely the ceramic guide 15, of the assembly 17.

In this way, heat from the heating element may be conducted, via the heater block 26, to the ceramic guide 15, promoting curing of the adhesive in contact therewith.

To ensure that the ceramic guide 17 is maintained in operative relationship with the heater block 26 until curing has been effected, a holding means in the form of a pivotally mounted lever 32 is provided within the housing.

The lever 32 comprises a bearing surface 33 which, in an operative position (shown at 32a in FIG. 2), bears upon an outer surface of the ceramic guide 15, clamping it in position, relative to the heater block.

The bearing surface 33 may be roughened or knurled to improve grip on the ceramic guide 15 if desired.

As can also be seen from FIG. 2, the lever 32 is pivotally mounted about a pivot 34, with a heel portion 35 of the lever being acted upon by a plunger 36 associated with an operating button 37, such that reciprocating movement of the plunger 36 causes pivotal movement of the lever 32.

Although not shown in the drawings, the operating button 37 is resiliently biased by a coil spring or similar device to the operative position shown at 32a.

In this way, therefore, pressure must be applied to the operating button 37 to "release" the lever, and to allow introduction of the assembly 17.

Removal of this pressure causes the bearing surface to bear upon an outer part of the ceramic guide 15, thus clamping the assembly firmly in position.

So that a visual check may be made, to ensure correct positioning of the assembly 17 within the housing 21, a pair of viewing apertures 38 are provided, giving an operator a line of sight extending generally perpendicular to the direction of insertion of the assembly 17.

To render the device portable and easily movable, a handle 40 is formed integrally with the housing 21, with both the handle 40 and the housing 21 being formed from, or having an outel surface formed from, a heat insulating material.

In this way, any risk of burns being caused to the user or to surrounding materials is substantially removed.

Control of the temperature/time profile adopted during the curing operation is achieved by connection of the device 20 to a commercially available process controller, through a control lead (not shown) extending through a bore within the handle 40.

Finally, so that the device 20 may be used in a variety of positions, attachment means, conveniently in the form of hook and loop fastening material 41 may be attached to the housing, conveniently making use of the fastener 24, shown in FIG. 3

The invention provides a simple and effective means to promote the curing of adhesive for fibre optic cable terminations in conditions where space is limited, such as, for example, the conifines of an aircraft. The device 20 holds the fibre/termination 17 securely in position whilst the adhesive cures. Moreover, the device will function regardless of its orientation, which is desirable in the case of use in the confines of an aircraft.

Furthermore, the device 20 has no detachable components (other than the heating element 28, which is retained securely in position by screw-threaded engagement), so that no parts can be dropped or lost during operation of the device.

What is claimed is:

1. A device for applying heat to an adhesive of the type used to set an optical fibre in a termination therefor, wherein the device comprises a portable housing, heating means disposed within the housing and holding means for holding the termination in operative relationship with the heating means to promote curing of the adhesive wherein the heating means comprises a heating member having at least one recess or aperture therein and the or each recess or aperture is provided along an edge portion of the heating member.

2. A device according to claim 1 wherein the heating member comprises a plurality of differently sized and/or configured recesses or apertures, adapted to receive a variety of sizes or types of optical fibre terminations therein.

3. A device according to claim 1 wherein the heating member is removable from the housing.

4. A device according to claim 1 wherein the heating member is generally elongate, and the recesses/apertures are provided along two opposite sides thereof.

5. A device according to claim 1 wherein the heating member is heated by a heating element and the heating element is located, in use, generally within the heating member.

6. A device according to claim 1 wherein the heating member is heated by a heating element and the heating element is releasably attachable to the heating member.

7. A device according to claim 1 wherein the holding means comprises a bearing surface, which, with the holding means in an operative position, bears upon a guide of the termination, urging it into operative relationship with the heating means.

8. A device according to claim 7 wherein the heating member comprises a plurality of different sized and/or configured recesses or apertures, adapted to receive a variety of sizes or types of optical fibre termination's therein, and the bearing surface of the holding means is adapted to hold in operative relationship a termination disposed within any of the recesses/apertures.

9. A device according to claim 7 wherein the holding means is moved from its operative position to an inoperative position by the action of an operating member, which in use protrudes from the housing.

10. A device according to claim 9 wherein the operating member is mounted for reciprocating movement relative to the housing.

11. A device according to claim 10 wherein linkage means is provided to convert reciprocating movement of the operating member to pivotal movement of the holding means.

12. A device according to claim 1 wherein the holding means comprises a clamping member.

13. A device according to claim 12 wherein the clamping member is mounted about a pivot within the housing.

14. A device according to claim 12 wherein the clamping member is urged towards its operative position by the action of a resilient member.

15. A device according to claim 1 wherein the housing comprises at least one viewing aperture therein, to enable an operator to ensure that correct insertion of the termination has occurred.

16. A device according to claim 1, further provided with a handle portion, so that movement and positioning of the device may be facilitated.

17. A device according to claim 1 wherein the housing is provided with attachment means to enable it to be secured in position in use.

18. A device according to claim 17 wherein the attachment means comprises a hook and loop fastener material arrangement.

19. A method of setting a fibre of a fibre optic cable in a termination therefor, comprising:
   a) engaging the fibre with the termination;
   b) applying adhesive or causing adhesive to be applied to the fibre and/or termination;
   c) introducing the engaged fibre and termination into a portable housing containing heating means wherein the heating means comprises a heating member having at least one recess or aperture therein provided along an edge portion of the heating member; and
   d) holding the assembly of fibre, termination and adhesive with a holding means in the recess or aperture, in operative relationship with the heating means, until curing of the adhesive, promoted by the heating means, has been effected.

20. A device for applying heat to an adhesive of the type used to set an optical fibre in a termination therefor, wherein the device comprises a portable housing, heating means disposed within the housing and holding means for holding the termination in operative relationship with the heating means to promote curing of the adhesive, and wherein the heating means comprises a heating member having at least one recess or aperture therein, and the heating member comprises a plurality of differently sized and/or configured recesses or apertures, adapted to receive a variety of sizes or types of optical fibre terminations therein.

21. A device for applying heat to an adhesive of the type used to set an optical fibre in a termination therefor, wherein the device comprises a portable housing, heating means disposed within the housing and holding means for holding the termination in operative relationship with the heating means to promote curing of the adhesive, and wherein the heating means comprises a heating member having at least one recess or aperture therein, and wherein the heating member is removable from the housing.

22. A device for applying heat to an adhesive of the type used to set an optical fibre in a termination therefor, wherein the device comprises a portable housing, heating means disposed within the housing and holding means for holding the termination in operative relationship with the heating means to promote curing of the adhesive, and wherein the heating means comprises a heating member having at least one recess or aperture therein, and wherein the heating member is generally elongate, and the recesses/apertures are provided along two opposite sides thereof.

23. A device for applying heat to an adhesive of the type used to set an optical fibre in a termination therefor, wherein the device comprises a portable housing, heating means disposed within the housing and holding means for holding the termination in operative relationship with the heating means to promote curing of the adhesive, and wherein the heating means comprises a heating member having at least one recess or aperture therein, and wherein the heating member is heated by a heating element, the heating element being located, in use, generally within the heating member.

24. A device according to claim 23 wherein the heating element is releasably attachable to the heating member.

* * * * *